United States Patent [19]
Martini

[11] Patent Number: 5,909,693
[45] Date of Patent: Jun. 1, 1999

[54] SYSTEM AND METHOD FOR STRIPING DATA ACROSS MULTIPLE DISKS FOR CONTINUOUS DATA STREAMING AND INCREASED BUS UTILIZATION

[75] Inventor: Edward W. Martini, Newark, Calif.

[73] Assignee: Digital Video Systems, Inc., Santa Clara, Calif.

[21] Appl. No.: 08/694,432

[22] Filed: Aug. 12, 1996

[51] Int. Cl.$^6$ .............................. G06F 13/00; G06F 12/00
[52] U.S. Cl. .......................... 711/114; 711/157; 711/168; 711/169; 395/840; 395/873
[58] Field of Search .................................. 395/441, 484, 395/495, 496, 405, 840, 841, 873; 365/230.03, 230.04; 711/114, 157, 168, 169, 5

[56] References Cited

U.S. PATENT DOCUMENTS

| | | | |
|---|---|---|---|
| 3,623,022 | 11/1971 | Day | 395/157 |
| 5,404,454 | 4/1995 | Parks | 395/841 |
| 5,510,905 | 4/1996 | Birk | 358/342 |
| 5,586,264 | 12/1996 | Belknap et al. | 395/200.08 |
| 5,588,129 | 12/1996 | Ballard | 395/113 |
| 5,590,381 | 12/1996 | Mourad | 395/872 |

OTHER PUBLICATIONS

*An Introduction to RAID—Redundant Arrays of Inexpensive Disks;* McLean, Pete; Apr. 24, 1991.
*RAID Project Bibliography;* University of California, Berkley; Jan. 17, 1991.
*FAQ File;* Rasmussen, Constantine @ cdr@star.net.
Public Release of MD (Multiple Devices); Zyngier, Marc; Aug. 5, 1996.

*Primary Examiner*—Glenn Gossage
*Attorney, Agent, or Firm*—Sawyer & Associates

[57] ABSTRACT

A system and method for storage and continuous delivery of a plurality of data files in a data stream are disclosed. The system and method include storing at least one data file of the plurality of data files, allowing each user to select the at least one data file for delivery, and transferring data from the first disk and the second disk alternately over a bus to at least one user. The at least one data file includes a plurality of data blocks and is stored by storing the plurality of data blocks in a first disk and a second disk. The first and second disks further include a plurality of blocks. Storing the at least one data file further includes the steps of (a1) storing a data block of the plurality of data blocks in a next available block of the first disk, (a2) storing a next data block of the plurality of data blocks in a corresponding block on the second disk, and (a3) repeating steps (a1) and (a2) until the at least one data file is completely stored. The at least one data file is stored on a first plurality of adjacent blocks in the first disk and a second plurality of adjacent blocks on the second disk. The method includes performing a first seek operation to find a next block on the second disk while a read and data transfer is performed for a current block on first disk and performing a second seek operation on the first disk to find a next block on the first disk while a read and data transfer is performed for a current block on the second disk.

19 Claims, 2 Drawing Sheets

SYSTEM AND METHOD FOR STRIPING DATA ACROSS MULTIPLE DISKS FOR CONTINUOUS DATA STREAMING AND INCREASED BUS UTILIZATION

FIELD OF THE INVENTION

The present invention relates to a method and system for continuous media computer systems and more particularly to a method and system for increasing the data transfer rate for a continuous media computer system.

BACKGROUND OF THE INVENTION

Conventional computer data streams are usually accessed randomly. In such a file system, a user generally moves from place to place in the file without requiring continuous playback of the entire file. In addition to not being presented all at one time, typical data files are relatively small.

A different type of data is continuous media data. Continuous media data files are used to store and deliver data such as movies or music titles. For continuous media data files, the data stream is delivered in order, rather than in a random fashion chosen by the user. In addition, the data files are typically very long. A karaoke or music video title, for example, is approximately four minutes long and about 40 megabytes (MB) in size.

Typical computer systems store data in blocks. Each block has a disk block size. The disk block size is the smallest amount of information that the computer system can access. The location of each block on the disk is marked by a pointer. To access a file, the pointer is moved to each block in the correct order.

When conventional computer systems store a data file on disk, the locations of the block or blocks holding the data are typically chosen randomly. When reading a file, the disk pointer may have to move to a new, randomly chosen location for each block of data. In order to move the disk pointer to a new block, conventional systems perform a seek operation. The seek operation determines the location of the new block and moves the pointer to the new block's location on the disk. The system can then read the data in the new block and deliver it to the user.

Conventional systems using small computer system interface ("SCSI") buses and disks often deliver data from the SCSI disk over a SCSI bus. In order to deliver a stored data file, conventional systems using SCSI disks and buses perform several operations. The system reads the command from the SCSI bus, disconnects the SCSI disk from the SCSI bus, seeks the appropriate blocks on the SCSI disk, reconnects to the SCSI bus, then reads and transmits the data over the SCSI bus. Typical fast SCSI buses can transmit data at a rate of approximately ten to forty megabytes (MB) per second. However, typical fast SCSI disks are capable of delivering accessed data at a rate of only five megabytes (MB) per second. Thus, conventional SCSI disks do not utilize the full capacity of typical SCSI buses when transmitting data at the disks' maximum rate.

Continuous media computer systems are employed to provide real time delivery of lengthy continuous media data files. A single computer using conventional architecture may be capable of playing a single continuous media stream for a single user. However, one computer may not be capable of providing real-time delivery of continuous media streams for many users at one time. In general, conventional computer systems may be too slow to access and deliver the blocks comprising the continuous media data file in real time. This difficulty is partially due to the rate at which conventional systems can deliver the data.

Accordingly, what is needed is a system and method for faster delivery of continuous media data files, particularly for multiple users. The present invention addresses such a need.

SUMMARY OF THE INVENTION

The present invention provides a method and system for storage and delivery of a plurality of data files. The system and method comprise providing a first disk and second disk, the first and second disks further having a plurality of blocks for storing the plurality of data files. The system and method further comprise dividing each of the plurality of data files into at least one data block. At least one of the plurality of data files is divided into a plurality of data blocks having an order. The at least one data file is stored by storing the plurality of data blocks in a portion of the plurality of data blocks in order alternately on the first and second disks. The system and method also comprise performing a seek operation and transferring data to or from the first and second disks. The first and second disks are read alternately to read the portion of the plurality of data blocks in order. At least a portion of a seek operation is performed on the second disk to find a next block on the second disk while a read and data transfer is performed for a current block on the first disk. Similarly, at least the portion of the seek operation is performed on the first disk to find a next block on the first disk while a read and transfer is performed on a current block of the second disk. Consequently, the bus is utilized more often during delivery of the at least one data file than the bus would be utilized by only the first or second disk alone.

According to the system and method disclosed herein, the present invention increases the rate at which data can be transferred, thereby decreasing the time required to deliver a particular data file. Real time delivery of continuous media data files to a predetermined number of users is thus made more feasible. Consequently, overall system performance is increased.

DETAILED DESCRIPTION OF THE INVENTION

Figure 1:
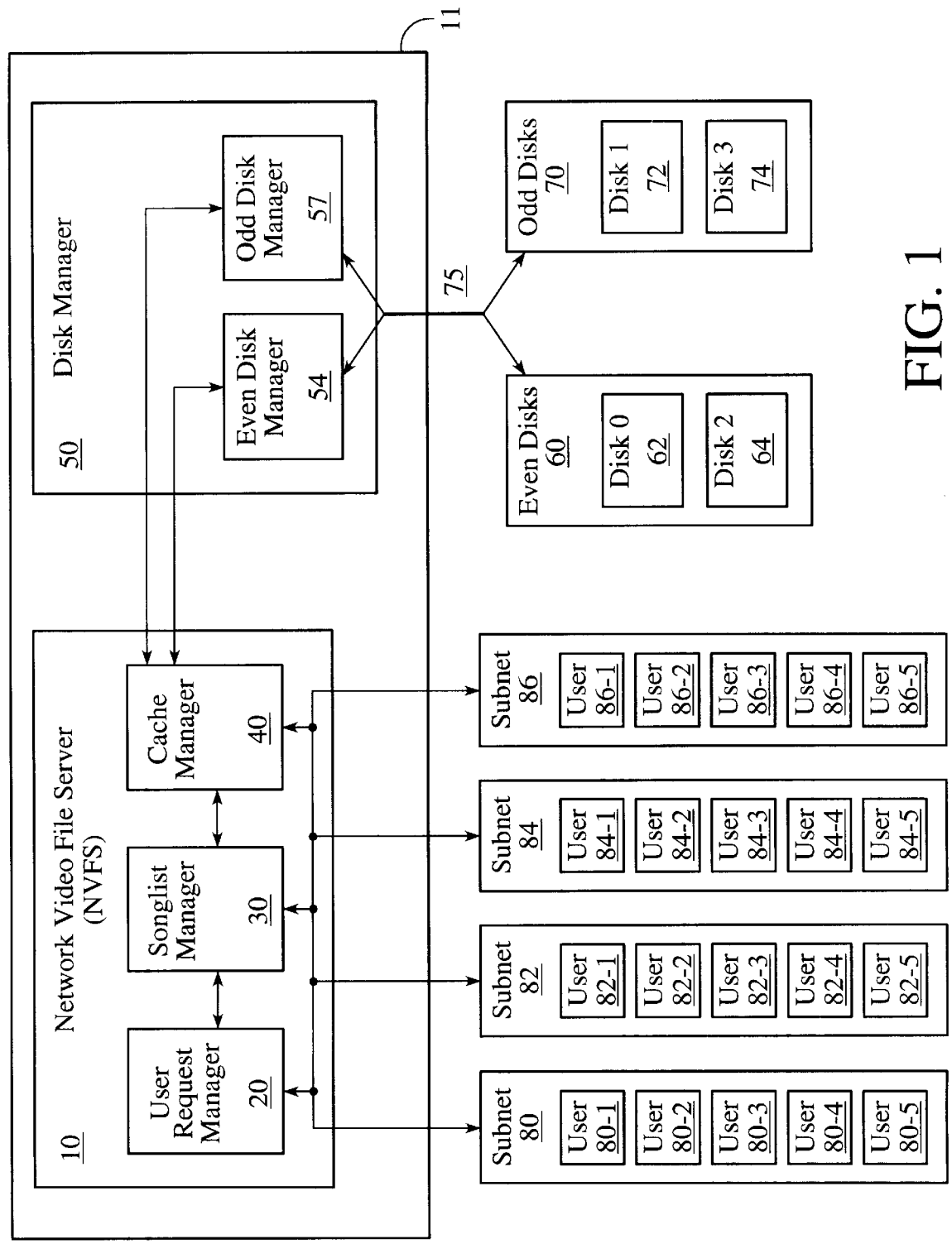
FIG. 1 is a block diagram of one embodiment of a computer system in accordance with the present invention.

The present invention relates to an improvement in continuous media computer systems, particularly those serving multiple users. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Continuous media streams are used to store and deliver data such as movies or music titles. In continuous media streams, the entire data stream is delivered in order. In addition, the data files are typically very long. A karaoke title, for example, is approximately four minutes long and requires approximately 40 megabytes (MB) for storage in a computer.

Continuous media computer systems provide real time delivery of lengthy, continuous media data files. A single computer using conventional architecture may be capable of playing a single continuous media stream for a single user. However, those with ordinary skill in the art will realize that partly because of the inability of typical disks to deliver data at a high enough rate, a file system employing conventional architecture, for example a network video file server, may not be capable of serving many users.

For example, conventional systems using SCSI buses and disks often deliver data from the disk over a SCSI bus. In order to deliver a stored data file, conventional systems using SCSI disks and buses perform several operations. The system reads the command from the SCSI bus, disconnects from the SCSI bus, seeks the appropriate blocks on the SCSI disk, reconnects to the SCSI bus, then reads and transmits the data over the SCSI bus.

When a file requiring more than one block is stored on a disk, the locations of the blocks holding the data are typically chosen randomly. When reading a file, the disk pointer may have to move to a new, randomly chosen location for each block for data. For a large file, such as a continuous media data stream, the disk pointer may move a large number of times because a large number of blocks are typically required.

Each time the pointer moves to a new block, a seek operation is performed. A seek operation finds the location of the block to be read and moves the pointer to this location. Thus, each seek operation performed adds to the time required for the SCSI disk to read the file. Consequently, the read operation increases the time required for the SCSI disk to deliver the file.

After the seek operation has been performed, data in a block is read and transferred. Typical SCSI buses can transmit data at a rate of approximately ten to forty megabytes (MB) per second. However, typical SCSI disks are capable of delivering data at a rate of five megabytes (MB) per second. The only known system in which SCSI disks might approach a data rate of ten MB per second is a system having multiple users and multiple disks. In such a system, if two users happen to utilize the same SCSI bus and happen to be reading from different SCSI disks, the SCSI disks may utilize the SCSI bus relatively continuously. In such a case, the SCSI disks are transferring data to the SCSI bus at a rate greater than five MB per second. However, because the disk block sizes in such systems are small, a large number of seek operations may be performed for large data files. Since the seek operation takes a finite amount of time and a disk does not transfer data during a seek operation, the disks may transfer data more slowly. Thus, even in this special case, the rate at which the SCSI disks transfer data to the SCSI bus may be limited. In most other cases, the system may still be limited to the maximum rate of transfer from a single SCSI disk.

When multiple users access the system, this problem is compounded. In a multiple user file system, each user's process is swapped in and acquires rights to the disk subsystem. For each user, the file system seeks and accesses each block of data in the continuous media stream. When many users attempt to access continuous media data, the file system switches between users as well as finds and accesses blocks for each user's continuous media stream.

Since they transfer data at a lower rate, conventional SCSI disks do not utilize the full capacity of typical SCSI buses even when the SCSI disk is transmitting data at the maximum rate. Because of this, the rate at which the computer system can transfer a continuous media data file to a user is limited, making it more difficult for the system to provide real time delivery of large, continuous media data files. Thus, this failure to use the full capacity of SCSI buses contributes to conventional computer systems' inability to deliver continuous media data streams to multiple users in real time.

The present invention provides for a method and system for increasing the transfer rate of continuous media data streams from disks to system memory. Thus, the method and system aid in providing real time delivery of a continuous media data stream. The method and system also have particular utility in a multiple user file server, where rapid delivery of data to each user is important. The present invention will be described in terms of a file server for twenty users delivering video clips using continuous media data streams. However, one of ordinary skill in the art will readily recognize that the method and system operate effectively for file servers having a different number of users as well as other types of systems. In addition, the present invention will be described in terms of SCSI disks and SCSI buses. However, one of ordinary skill in the art will readily recognize that the method and system operate effectively for other disks and buses.

The method and system significantly increase the rate at which disks can deliver a continuous media data stream, thereby aiding in real time delivery of continuous media data files. The method and system stripe data across adjacent blocks in pairs of disks. When delivering a file, the pair of disks utilize greater capacity of the bus connecting the disks to the remainder of the system. Consequently, the blocks in which a particular data file resides can be delivered to a user more rapidly. Where a plurality of disks having large blocks are used, the rate of data transfer from the disks can be further increased by overlapping the seek time with real time. Seek time delays are eliminated by allowing a seek of one block while an adjacent block is being read and transferred from the disk to the bus.

To more particularly illustrate the method and system in accordance with the present invention, refer now to FIG. 1 depicting a block diagram of one embodiment of a computer system 11 employing the method and system. The embodiment shown includes a network video file server (NVFS) 10. In the embodiment shown in FIG. 1, the NVFS 10 serves a total of twenty clients on subnets 80, 82, 84, and 86. In the present embodiment, each subnet 80, 82, 84, and 86 serves 5 users. In FIG. 1, the users for subnet 80 are shown as 80-1 through 80-5; the users for subnet 82 are 82-1 through 82-5; the users for subnet 84 are 84-1 through 84-5; and the users for subnet 86 are 86-1 through 86-5. However, nothing prevents the method and system from being used with a different number of users or a different number of subnets.

The client or user request manager 20 manages the requests for data from each user 80-1 through 86-5, to determine user access to the data available through the NVFS 10. Songlist manager 30 determines the titles available for the users 80-1 through 86-5 to access.

The embodiment in FIG. 1 also includes four disks: disk zero 62, disk one 72, disk two 64, and disk three 74. Although the present embodiment utilizes two pairs of disks, nothing in the method and system prevent the use of a different number of pairs of disks. In addition, another preferred embodiment currently utilizes only one pair of disks. Disks 62, 64, 72, and 74 of the embodiment shown in FIG. 1 are SCSI disks. Consequently, in one embodiment, each disk is capable of delivering a maximum of approximately five MB per second. Communication between SCSI disks 62, 64, 72, and 74 and the remainder of the system 11 is accomplished through SCSI bus 75. In one embodiment, SCSI bus 75 is capable of transferring approximately ten MB per second.

Figure 2:
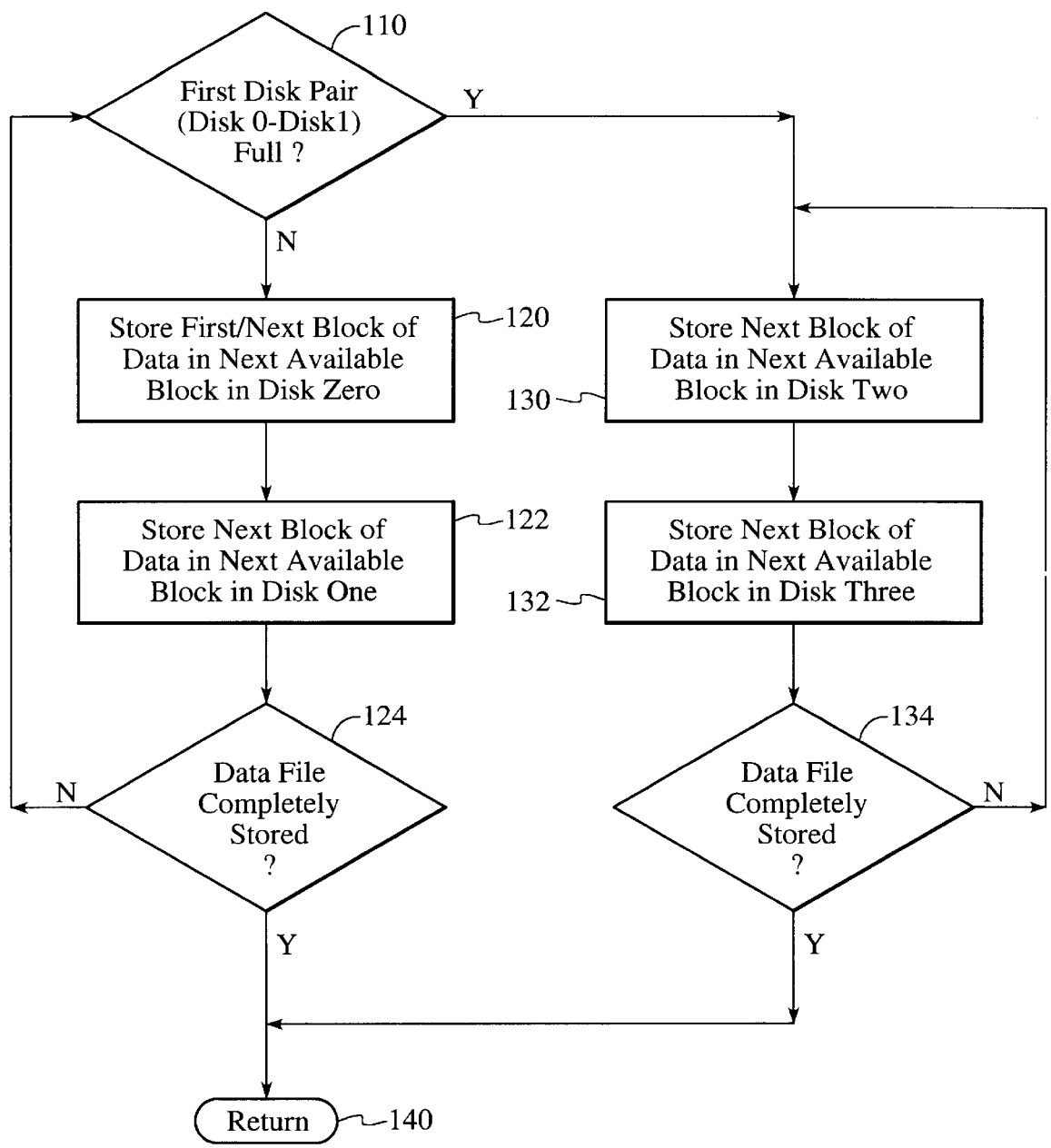
FIG. 2 is a simplified flow chart depicting one embodiment of the method in accordance with the present invention.

To increase the effective rate that the SCSI disks 62, 64, 72, and 74 deliver a data file, data is striped across adjacent blocks in pairs of disks. FIG. 2 displays a simplified flow chart of one embodiment of a method 100 for striping data across pairs of disks. In the embodiment of FIG. 2, it is determined in step 110 if the first pair of disks, disk zero 62 and disk one 72 in the present embodiment, are capable of storing additional data. If at least a portion of the data file can be stored in disk zero 62 and disk one 72, the first block of data of a particular data file is placed in a first available block in disk zero 62 in step 120. The second block of data in the particular data file is placed in the corresponding available block in disk one 72 in step 122.

If it has been determined, in step 124, that the data file has not been completely stored, steps 110 through 124 are repeated. If the first pair of disks continues to have available space, the next (third) block of data in the particular data file is placed in the next available block of disk zero 62. Similarly, the fourth block of data in the particular data file is placed in the corresponding block of disk one 72. The data continues to be striped across disk zero 62 and disk one 72 until the file has been completely stored. The data files are striped across successive blocks in disk zero 62 and disk one 72 until disk zero 62 and disk one 72 have reached capacity.

In one embodiment, once it has been determined in step 110 that the first pair of disks has reached capacity, data is striped across pairs of blocks in disk two 64 and disk three 74 in a similar manner in steps 130 through 134.

Referring back to FIG. 1, cache manager 40 determines in which pairs of blocks in disk zero 62, disk one 72, disk two 64, and disk three 74 each continuous media data file is stored. Cache manager 40 also maintains a list of the blocks containing each data file. As discussed in U.S. patent application Ser. No. 08/700,614, entitled "BLOCK SIZING FOR MULTIPLE USER CONTINUOUS MEDIA DATA SYSTEM", now abandoned, in one embodiment, the cache manager 40 also determines the disk block size rather than using the disk block size set by a default file system.

Disk manager 50 controls SCSI disks 62, 64, 72, and 74 using even disk manager 54 and odd disk manager 57. Even disk manager 54 controls disk zero 62 and disk two 64. Similarly, odd disk manager 57 controls disk one 72 and disk three 74.

To deliver a file, the disk manager 50 in the embodiment in FIG. 1 accesses the list of blocks for a particular file maintained by the cache manager 40. Disk manager 50 then finds the blocks where the file is located on disk pairs disk zero 62 and disk one 72 or disk two 64 and disk three 74. The blocks are then read and transmitted in the order on the list to ensure accurate delivery of the file.

Because the data has been striped across disk zero 62 and disk one 72, or across disk two 64 and disk three 74, greater capacity of the SCSI bus 75 can be utilized. Because continuous media data files are being accessed, the location of the next block on the list is known. The next block to be read resides on a different disk than the disk on which the current block resides. Therefore, as a block from the first disk in the pair is being read and transmitted, a seek operation can be used to find the next block from the second disk in the pair. As a block from the second disk is being read and transferred to the SCSI bus 75, a seek operation can be performed on the first disk to find the next block. This process can be repeated until all of the blocks in which the file resides have been delivered.

Because a seek operation is performed on one disk while a read and transfer is performed on a block from the other disk, the SCSI bus 75 is being utilized even while one disk is seeking. Since the SCSI bus 75 may not lie idle for the full seek time of a particular disk, the transfer rate of the pair of disks may be greater than that of one disk alone. Thus, the rate of data transfer from the SCSI disks 62, 64, 72, and 74 over SCSI bus 75 may not be limited by the transfer rate of a single SCSI disk. Due to this increase in speed, the ability to provide real time delivery of continuous media data files is improved.

This aspect of the method and system can be further improved by ensuring that SCSI bus 75 is transferring data at substantially all times that a particular file is being accessed. As discussed previously, U.S. patent application Ser. No. 08/700,614, entitled "BLOCK SIZING FOR MULTIPLE USER CONTINUOUS MEDIA COMPUTER SYSTEM", now abandoned, discloses a method and system for determining the disk block size. Thus, the method and system in accordance with the present invention may be combined with the method and system described in U.S. patent application Ser. No. 08/700,614, entitled "BLOCK SIZING FOR MULTIPLE USER CONTINUOUS MEDIA COMPUTER SYSTEM now abandoned." If the methods and systems are so combined, the disk block size may be set so that the seek time is nearly invisible to the system 10. In order to accomplish this, the disk block size is set such that the time required to read a data file is greater than or equal to the time required for a seek operation.

A single disk only utilizes a SCSI bus when a read and transmit of data are being performed. Consequently, the SCSI bus may be idle during a seek operation. However, in one embodiment of the method and system in accordance with the present invention, each disk alternates between a seek operation and a read and transfer of data from a block. Thus, the SCSI bus 75 may be utilized for the entire time a file is being accessed if the time required for a read and transfer of data is greater than or equal to the time required for a seek operation to be performed. In such a case, one disk transfers data over the SCSI bus 75 while the other disk seeks, thereby making the seek time invisible to the computer system 11.

For example, if a seek operation is performed on one disk, such as disk zero 62, while a read and transfer of data is performed on a block of data in disk one 72, the SCSI bus 75 is utilized by disk one 72. When a block in disk zero 62 is being read and transferred, disk zero 62 utilizes SCSI bus 75. During this time, a seek may be performed on disk one 72. Since one disk performs a read and transmit of data while the other disk is seeking, the seek time is invisible to the system. Because the seek time is invisible to the system, the SCSI bus 75 does not lie idle while a particular file is delivered. Consequently, making the seek time invisible to the system 11 improves the ability of the system 11 to utilize the full capacity of SCSI bus 75. Note that the seek time may continue to be invisible to the system as long as a read and transfer of a block of data, the time the SCSI bus 75 is used by a disk, takes at least as long as a seek operation.

In the embodiment shown in FIG. 1, cache manager 40 may set the disk block size to allow the time to read and transfer the data in one block to be at least the same as the seek time. Note, however, if the seek time can be varied, it is also possible to set the seek time to be less than or equal to the time to read and transfer a block of data. For example, if the seek time is approximately ten milliseconds for a particular embodiment and SCSI disks 62, 64, 72, and 74 are each capable of transferring five MB/second, the amount of data in one block should be at least twenty five kilobytes (kB) in order to allow the time to read and transfer a block to be at least equal to the seek time. Thus, cache manager 40 may allocate space on each of the SCSI disks 62, 64, 72, and 74 in blocks of at least fifty kB.

Although blocks of at least 25 kB are required in one embodiment order to make the seek time invisible, a preferred embodiment uses blocks of 187 kB. Blocks of this size are used because they still make the seek time invisible and this size is the least common multiple of the amount of data in a internet packet and the amount of data in a sector on a compact disk. However, nothing prevents the use of a different sized block.

The method and system in accordance with the present invention may also be combined with both the method and system disclosed in U.S. patent application Ser. No. 08/700,614, entitled "BLOCK SIZING FOR MULTIPLE USER COMPUTER SYSTEM", now abandoned, and the method and system disclosed in co-pending U.S. patent application Ser. No. 08/694,399 entitled "REVERSE BLOCK ALLOCATION FOR GREATER MINIMUM THROUGHPUT," which provide an increased minimum data transfer rate from a plurality of disks. When so combined, the methods and systems provide an even greater improvement in performance.

A method and system has been disclosed for an increased rate of transfer of a continuous media data stream through the use of disks and buses. In order to accomplish this, the method and system stripe data in blocks across pairs of disks. In order to further enhance performance, the disks are allocated into blocks large enough such that the time to read and deliver a block is at least the time required to perform a seek operation.

Although the present invention has been described in accordance with the embodiments shown, one of ordinary skill in the art will readily recognize that there may be variations to the embodiments and those variations would be within the spirit and scope of the present invention. Accordingly, many modifications may be made by one of ordinary skill in the art without departing from the spirit and scope of the appended claims. In addition, although the present invention has been described in terms of a pair or pairs of disks, one of ordinary skill in the art will recognize that a different number of disks could be utilized with the present invention.

What is claimed is:

1. A system for storage and delivery of a plurality of data files comprising:

a first disk and a second disk, the first disk and the second disk further comprising a plurality of blocks for storing the plurality of data files;

means coupled to the first and second disks for storing each of the plurality of data files, each of the plurality of data files including at least one data block, at least one of the plurality of data files including a plurality of data blocks having an order, the at least one data file being stored by storing the plurality of data blocks in a portion of the plurality of blocks alternately on the first and second disks, the plurality of data blocks being stored in the order, the portion of the plurality of blocks further including a first portion of adjacent blocks on the first disk and a second portion of adjacent blocks on the second disk; and a bus coupled to the first disk and the second disk for transferring data to or from the first and second disks, the first and second disks being read alternately to read the portion of the plurality of blocks in the order, a first seek operation being performed on the second disk to find a next block on the second disk while a read and data transfer is performed for a current block on the first disk, a second seek operation being performed on the first disk to find a next block on the first disk while a read and transfer is performed on a current block of the second disk, the bus being utilized more often during delivery of the at least one data file than the bus would be utilized by only the first disk alone or the second disk alone.

2. The system of claim 1 wherein the first seek operation and the second seek operation each require a seek time for completion; and wherein each of the plurality of data blocks has a disk block size, the disk block size being set such that the seek time is less than or equal to a time required to read and transfer a data block.

3. The system of claim 2 wherein the first seek operation and the read and transfer of the current block on the first disk and the second seek operation and the read and transfer of the current block on the second disk are timed to allow the system to utilize the bus substantially all of the time that the at least one data file is being read.

4. The system of claim 3 wherein the plurality of data blocks further comprise even data blocks and odd data blocks, the even data blocks being stored in the order in the plurality of blocks in the first disk and the odd data blocks being stored in the order in the plurality of blocks in the second disk.

5. The system of claim 3 wherein the means for storing include a cache manager coupled to the first disk and to the second disk, the cache manager also determining the disk block size.

6. The system of claim 5 wherein the system is capable of delivering each of the plurality of data files to each of a predetermined number of users.

7. The system of claim 6 further comprising a user request manager coupled to the cache manager, the user request manager for providing the predetermined number of users with information relating to each data file and for allowing each user to select each data file for delivery.

8. The system of claim 7 wherein the user request manager further arbitrates each user's access to the plurality of data files.

9. The system of claim 8 wherein the cache manager further provides at least one block list, the at least one block list corresponding to the at least one data file, the at least one block list specifying a block in which each of the plurality of data blocks is stored and the order of the plurality of data blocks;

the system further comprising a disk manager coupled to the at least one disk and the cache manager, the disk manager for allowing delivery of the plurality of data blocks in the order specified by the block list.

10. A system for storage and delivery of a plurality of data files comprising:

a plurality of disks, each of the plurality of disks further comprising a plurality of blocks for storing the plurality of data files;

means coupled to the plurality of disks for storing each of the plurality of data files, each of the plurality of data files including at least one data block, at least one of the plurality of data files including a plurality of data blocks, the plurality of data blocks having an order, the at least one data file being stored by storing the plurality of data blocks in a portion of the plurality of blocks alternately in the plurality of disks, the plurality of data blocks being stored in the order, the portion of the plurality of blocks further including a first portion of adjacent blocks on each of the plurality of disks; and a bus coupled to the plurality of disks for transferring data to or from the plurality of disks, each of the plurality of disks being read alternately, a seek operation being performed on one disk of the plurality of disks to find a next block on the one disk while a read and data transfer is performed for a current block on another disk of the plurality of disks, the bus being utilized more often during delivery of the at least one data file than the bus would be utilized by a single disk alone.

11. The system of claim 10 wherein the seek operation requires a seek time for completion; and wherein each of the plurality of data blocks has a disk block size, the disk block size being set such that the seek time is less than or equal to a time required to read and transfer a data block.

12. The system of claim 11 wherein the seek operation on one disk and the read and transfer of the current block on the other disk are timed to allow the system to utilize the bus substantially all of the time that the at least one data file is being read.

13. The system of claim 12 wherein the system is capable of delivering each of the plurality of data files to a predetermined number of users.

14. A method for storage and delivery of a plurality of data files comprising the steps of:
 (a) storing at least one data file of the plurality of data files, the at least one data file including a plurality of data blocks, the at least one data file being stored by storing the plurality of data blocks in a first disk and a second disk, the first disk and the second disk further comprising a plurality of blocks, the storing step further comprising the steps of
  (a1) storing a data block of the plurality of data blocks in a next available block of the first disk,
  (a2) storing a next data block of the plurality of data blocks in a corresponding block on the second disk, and
  (a3) repeating steps (a1) and (a2) until the at least one data file is completely stored, such that the at least one data file is stored on a first plurality of adjacent blocks in the first disk and a second plurality of adjacent blocks on the second disk;
 (b) allowing each user to select the at least one data file of the plurality of data files for delivery; and
 (c) transferring data from the first disk and the second disk alternately over a bus to at least one user, the data transferring step (c) further including the steps of:
  (c1) performing a first seek operation to find a next block on the second disk while a read and data transfer is performed for a current block on first disk;
  (c2) performing a second seek operation on the first disk to find a next block on the first disk while a read and data transfer is performed for a current block on the second disk.

15. The method of claim 14 wherein the first seek operation and the second seek operation each require a seek time for completion; and wherein each of the plurality of data blocks has a disk block size set such that the seek time is less than or equal to a time required to read and transfer a data block.

16. The method of claim 15 wherein the first seek operation and the read and transfer of the current block on the first disk and the second seek operation and the read and transfer of the current block on the second disk are timed to allow the bus to be utilized substantially all of the time that the at least one data file is being read.

17. A method for storage and delivery of a plurality of data files comprising the steps of:
 (a) storing at least one data file of the plurality of data files, the at least one data file including a plurality of blocks and being stored by storing the plurality of data blocks in a plurality of disks, each of the plurality of disks further comprising a plurality of blocks having a disk block size, the storing step further comprising the steps of:
  (a1) storing a data block of the plurality of data blocks in a next available block of one disk of the plurality of disks,
  (a2) storing a next data block of the plurality of data blocks in a corresponding block on a next disk of the plurality of disks,
  (a3) repeating step (a2) for each of the plurality of disks, and
  (a4) repeating steps (a1) through (a3) until the at least one data file is completely stored, such that the at least one data file is stored in a first plurality of adjacent blocks on each of a portion of the plurality of disks;
 (b) allowing each user to select the at least one data file of the plurality of data files for delivery; and
 (c) transferring data from the plurality of disks alternately over a bus to at least one user, the bus being utilized more often during delivery of the at least one data file than the bus would be utilized by only a single disk alone, the data transferring step (c) further including the steps of:
  (c1) performing a seek operation on one disk to find a next block on the one disk while a read and data transfer is performed for a current block on another disk;
  (c2) performing a seek operation on the other disk to find a next block on the other disk while a read and data transfer is performed for a current block on the one disk.

18. The method of claim 17 wherein the seek operation requires a seek time for completion; and wherein the disk block size is set such that the seek time is less than or equal to a time required to read and transfer a data block.

19. The method of claim 18 wherein the seek operation on one disk and the read and transfer of the current block on the other disk are timed to allow the bus to be utilized substantially all of the time that the at least one data file is being read.

* * * * *